Aug. 18, 1970     J. E. PETERSEN     3,524,310
GATHERING APPARATUS
Filed July 28, 1967     2 Sheets-Sheet 1
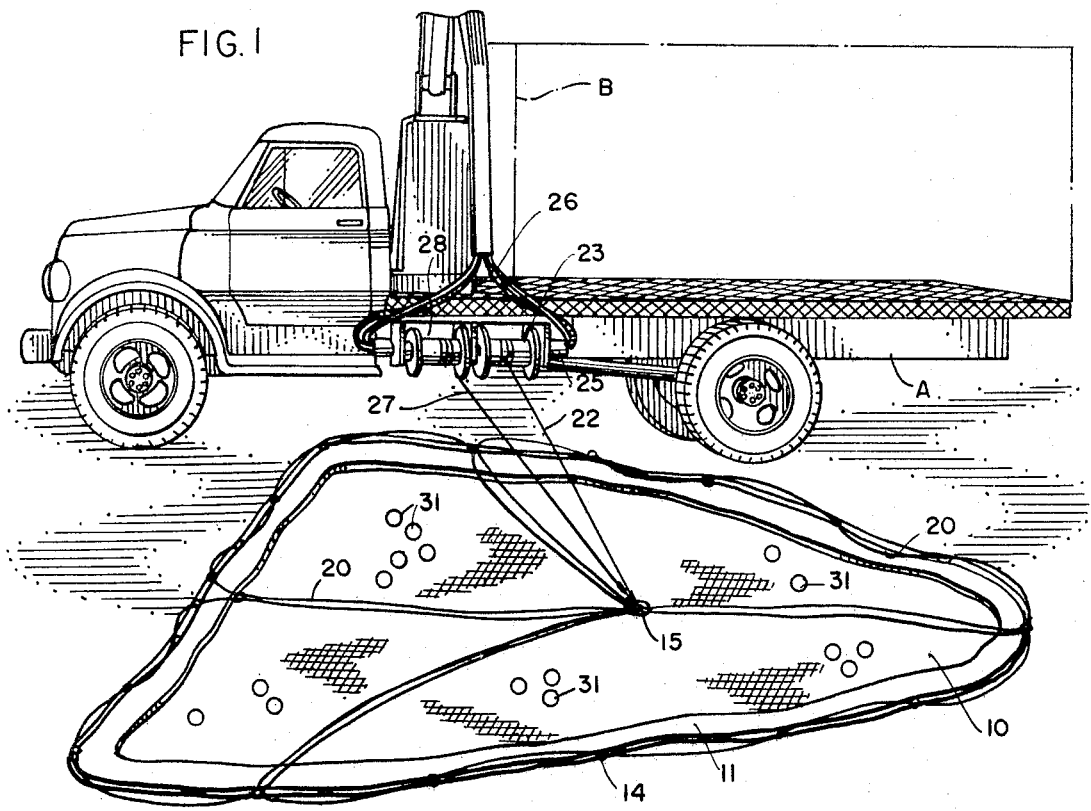
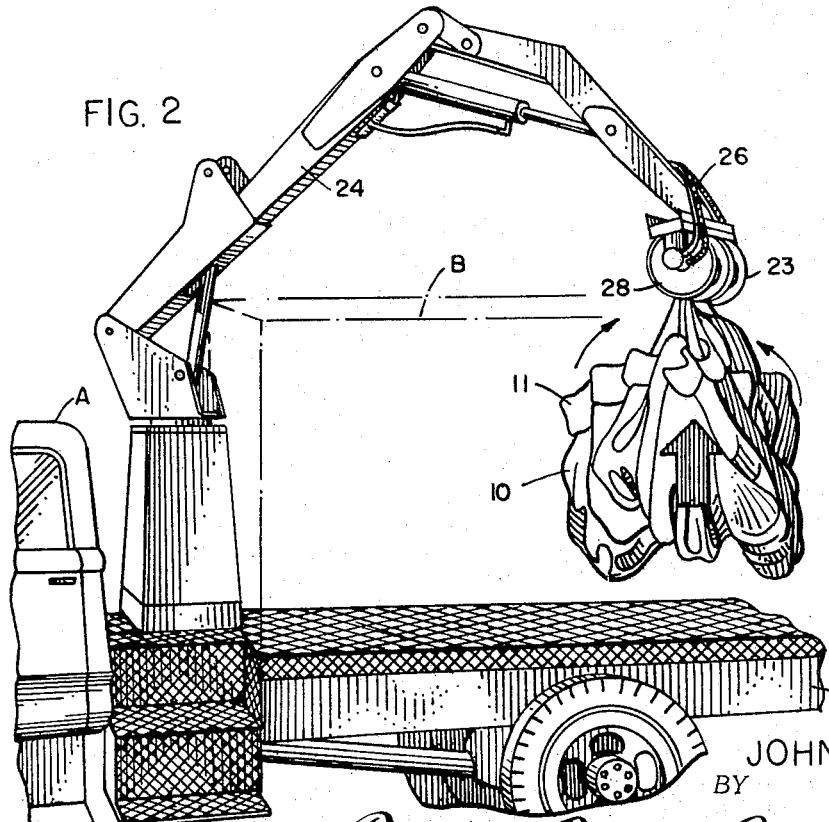
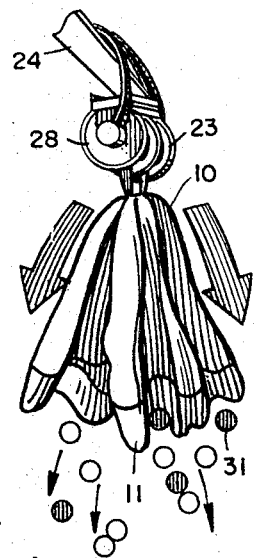
INVENTOR:
JOHN E. PETERSEN
BY
Dawson, Tilton, Fallon & Lungmus
ATT'YS

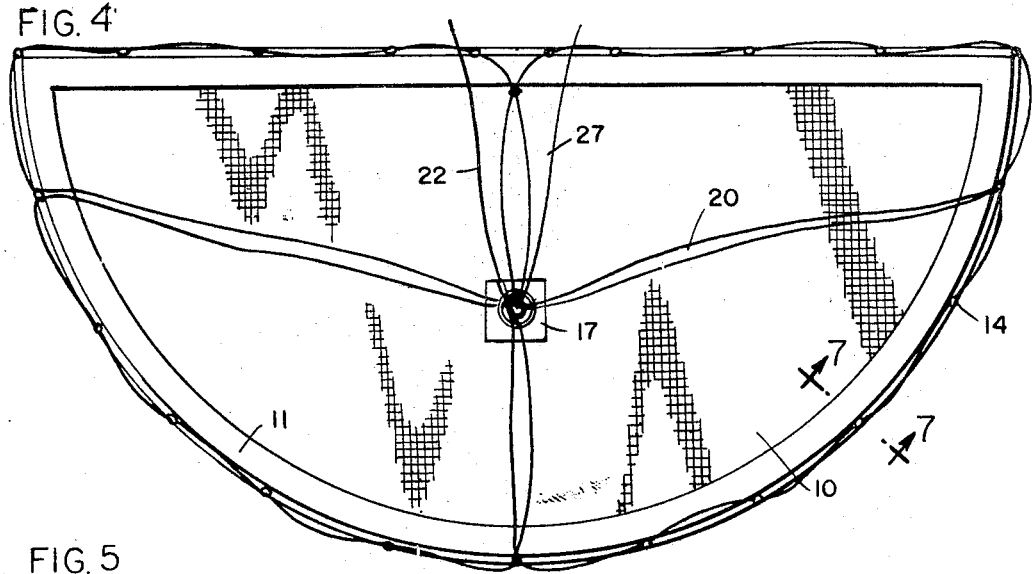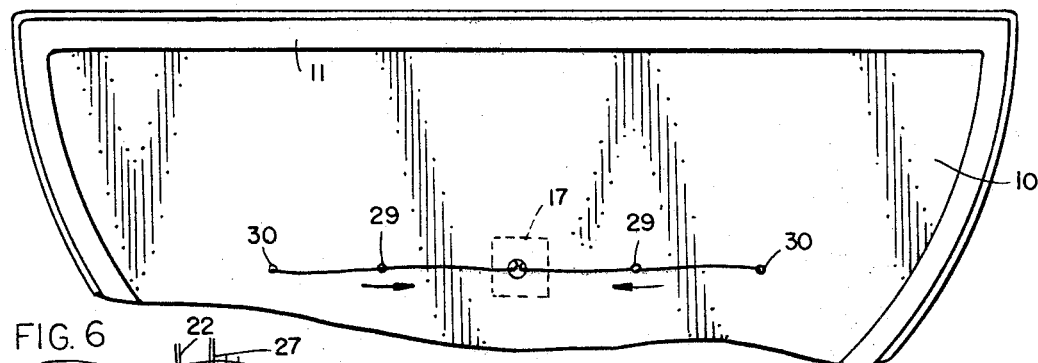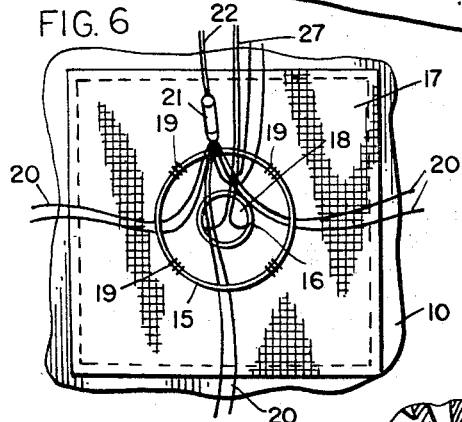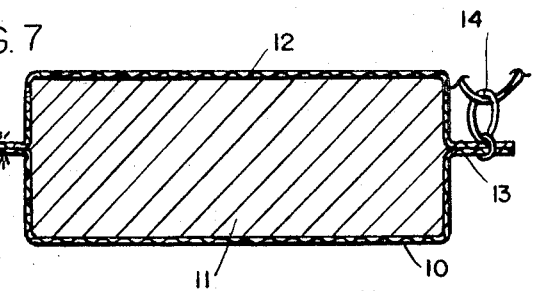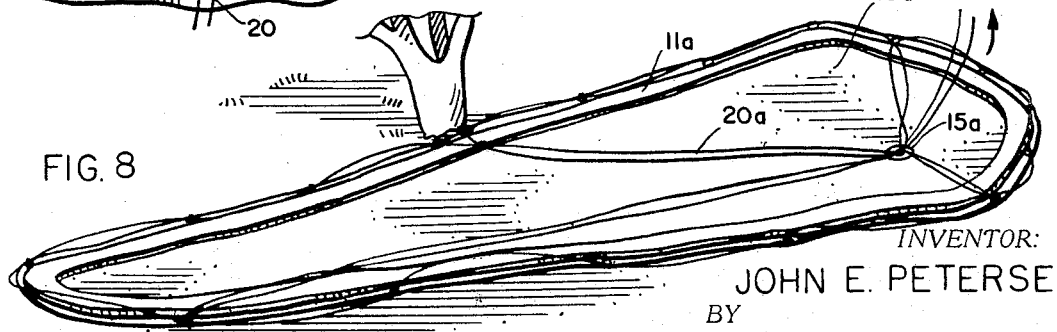

United States Patent Office 3,524,310
Patented Aug. 18, 1970

3,524,310
GATHERING APPARATUS
John E. Petersen, Highway 27 N. at Overpass,
Lake Wales, Fla. 33853
Filed July 28, 1967, Ser. No. 656,936
Int. Cl. A01g 19/00
U.S. Cl. 56—328                                7 Claims

ABSTRACT OF THE DISCLOSURE

A gathering web or canvas is placed under a fruit tree for receiving fruit from the tree. Flexible elements are connected to border portions of the sheet or web and extend through a ring which is secured to the web. A vehicle provided with a lift boom is equipped with a motor-driven drum connected to the flexible elements for drawing the web into bag formation about the fruit thereon and for hoisting the bag containing the fruit over a container which may be carried by the vehicle or placed alongside the vehicle.

The bag may then be opened for the removal of fruit. Preferably, a second drum is carried by the boom for drawing a flexible element which extends through the ring to the underside of the web and this supports and tends to invert the bag while it is in suspended position, and as the first drum releases the draw elements the bag is opened for the removal of the fruit.

BRIEF SUMMARY

The gathering of fruit, such as, for example, citrus fruit, nuts, and a wide variety of fruit, has long presented a problem because of the tedious and time-consuming picking and gathering operations. The labor cost sometimes exceeds the price obtained by the producer of the fruit. Apparatus has been developed for removing fruit from the tree, but the problem of gathering it still remains and, furthermore, the removed fruit must be carefully separated from faulty fruit lying on the ground.

I have discovered that fruit can be readily and economically gathered in a web which encloses the fruit in a bag formation, and the bag may be hoisted over a container and readily opened or reversed to remove the fruit. A wide canvas sheet or web or net is provided along its border with connection for drawing elements, and the draw elements are passed through a ring connected to the web and thence to a drum preferably carried by a hoisting boom. A raised border pad is secured around the edges of the web to provide a fence for enclosing the fruit and also to facilitate rolling the web inwardly and preventing the escape of fruit as the bag is formed. The draw elements for gathering the web are connected to a power-driven drum carried by the boom. A second power-driven drum on the boom is connected to a support element which engages a portion of the web to support it after the bag has been lifted over a container, and with the bag portion thus supported the first drum is operated to release the draw elements so that the bag is opened or reversed to deposit the fruit in the container.

DRAWINGS

FIG. 1 is a perspective view of apparatus which may be employed in the practice of my invention; FIG. 2, a perspective view showing the gathering web in bag formation containing fruit and in hoisted position; FIG. 3, a view similar to FIG. 2 but showing the web reversed in position for discharge of fruit; FIG. 4, a top plan view of the web in spread position for receiving fruit; FIG. 5, a bottom plan view of the web; FIG. 6, an enlarged detail view of a central portion of the web; FIG. 7, an enlarged detail sectional view, the section being taken as indicated at line 7—7 of FIG. 4; and FIG. 8, a perspective view of a modified form of gathering web with the ring supported adjacent one edge of the web.

DETAILED DESCRIPTION

In the illustration given in FIGS. 1–7 inclusive, 10 designates a web which may be a net, a sheet of canvas, plastic or other flexible material, and the web may be of any desired shape. I prefer to employ a web generally in a semicircular shape, as shown in FIG. 4. Around the border of the web 10, I provide a pad 11, such as, for example, a polyurethane pad, cellular rubber, or other suitable material, and the pad is stitched in position by a top strip 12 leaving at the outer side of the pad an edge border 13 to which guide rings 14 may be secured, as shown best in FIG. 7.

In the central portion of the web, I secure a ring 15, as shown best in FIG. 6. Within ring 15 there is a smaller ring 16, and the two rings are preferably reinforced by a central fabric piece 17. The central ring 16 communicates with an opening 18 which extends through the web 10. The outer ring 15 is secured to the reinforcing piece 17 and to the web 10 by spaced stitching 19 which leaves areas between the stitching for the movement of flexible draw elements 20. The draw elements 20 which pass through the spaces between stitching 19 extend outwardly, as shown best in FIG. 4, and pass through the guide rings 14. The inner ends of the draw elements 20 may be connected by a ferrule clamp 21 to a draw cord 22. The draw cord 22 extends to and is connected to a drum or winch 23 supported on the end of a power-driven hoist boom 24. The drum 23 may be driven by any motor means. In the ilustration given, a hydraulic motor 25 is connected by conduits 26 to a hydraulic pump (not shown) carried by the vehicle A.

The rotation of drum 23 is effective for drawing the elements 20 to produce a bag about the enclosed fruit, and the bag and fruit may be hoisted above a container B which may be supported on the vehicle or adjacent to the vehicle.

For releasing the fruit, flexible support elements 27 are carried by a second drum or support drum 28 which may be driven by motor means similar to motor 25. The support elements 27 extend through the inner ring 16 and, as shown best in FIG. 5, pass through guide rings 29 and are connected by fasteners 30 to the underside of the web 10. After the bag has been hoisted, as shown in FIG. 2, drum 28 may be operated to support the central portion of web 10 while also tending to gather it inwardly, while at the same time drum 23 may be released to allow the border portions of the web to fall downwardly for releasing the fruit, as shown best in FIG. 3.

While I prefer to have the drums 23 and 28 supported on the outer end of the power-driven boom 24, it is also practicable to have the boom equipped with guides for the passage of the draw elements and the power-driven drums or winches may be located on the vehicle or elsewhere on the boom. The drums may also be hand-operated if desired. The boom 24 is of well-known construction and is provided with hydraulic cylinders and pistons for moving the hinged portions of the boom to the desired lowered and elevated positions. The usual hydraulic rotating mechanism is also provided for rotating the boom. Since all of such structure is well known in the art, a further detailed description herein is believed unnecessary.

The location of the gathering rings 15 and 16 may be varied to meet different conditions. For most purposes, I prefer to have the ring rather centrally located, as shown best in FIG. 4. For some uses, however, it is desirable to locate the rings near an edge of the web, as shown in FIG. 8 where the rings are secured near the center of the arc of the semicircular web. For other conditions, it may be desirable to have the ring or rings located near one end of the straight border of the web.

By the term "ring or rings," I intend to include any guide structure for receiving the flexible draw elements and for directing the pull inwardly during the gathering operation.

In the operation of the apparatus and with the draw elements 22 and 27 released, the operator can readily spread the web under a tree and in position for receiving fruit. The fruit may be dislodged by shaking or employing mechanical means for moving the branches or fruit, or electric shock means, or any mechanism which causes the fruit to fall. When the web is positioned under the tree it may trap air between the web and the ground, and the entrapped air provides a cushioning effect to protect the fruit from bruising. The fruit itself aids in the gathering because it lies upon the web tending to hold the web against the ground as the borders of the web move inwardly. The draw element 22 moves the segment elements 20 inwardly, while at the same time the raised border pad 11 forms a fence to prevent the escape of fruit while also producing a rolling action of the wide web in the gathering operation. After the bag is formed, as shown best in FIG. 2, the boom is moved to lift the bag to a desired elevated position over a container which may be carried by the vehicle or be near the vehicle A. The drum 28 is then operated to draw the support elements 27 into position for supporting a central portion of the web 10, while at the same time drum 23 is actuated to slacken or release the elements 20, thus allowing the bag to reverse itself and the fruit 31 to be placed within the container. The reversing of the bag opens and spreads the web 10 so that it is now ready for drawing under another area below a tree for the collection of fruit. In this manner, fruit can be gathered quickly, raised above a container, and quickly released from the web.

A number of webs may be used with a single boom-equipped vehicle. Each web is positioned under a tree to receive the fruit. As each tree is harvested the vehicle is driven up to the web and the draw elements 22 and 27 of the web are attached to their associated drums. After the fruit is removed from the web, the draw elements may be unconnected from the drums, and the web may be positioned under another tree. The vehicle may then proceed to another harvested tree to repeat the gathering operation.

While I have shown a method for releasing the fruit from the web by reversing the web, it will be understood that, if desired, the web may be provided with openings provided with zipper connections or with other means for quickly opening the web for the release of fruit. Further, the drums may also be operated by hand by means of a crank rather than being power operated.

Although I have described the web as being relatively flexible, it may also be relatively rigid so that it may be picked up either by a power operated boom or by a fork lift truck or the like. When the web is positioned over the container B, it may be tilted to dump the fruit or an opening may be provided in the web.

While in the foregoing specification I have set forth specific structure in considerable detail for the purpose of illustrating embodiments of the invention, it will be understood that such details may be varied widely by those skilled in the art without departing from the spirit of my invention.

What is claimed is:

1. In apparatus for the gathering of fruit from a tree, a gathering web adapted to be placed under a tree to receive fruit therefrom, a ring member fixed to said web, flexible draw elements secured to peripheral portions of said web and having portions extending through said ring, a vehicle equipped with a container and with a power-operated boom, a pair of power-operated drums supported on the end portion of said boom, means connecting said draw elements to one of said drums, an inner ring secured to said web, flexible support elements carried by the other of said drums and extending through said inner ring, and means for connecting the support elements to an underside of the web.

2. The apparatus of claim 1 including a flexible fruit-retainer pad secured to a border portion of said web.

3. The apparatus of claim 1 including guide rings secured about a border of said web, said draw elements extending through said guide rings.

4. In apparatus for the gathering of fruit from a tree, a gathering web adapted to be placed under a tree to receive fruit therefrom, a draw ring member secured to a central portion of said web, draw elements extending through said draw ring and attached to a periphery of the web, said draw elements being adapted for connection to power-operated means for drawing said draw elements to gather the web into a bag, and a flexible support element secured to a central portion of the web, whereby upon releasing of said flexible draw elements said bag is opened.

5. The apparatus of claim 4 including an inner ring secured to said web, said flexible support element extending through said inner ring, and means for connecting the support element to an underside of the web.

6. The apparatus of claim 4 including a flexible fruit-retainer pad secured to a border portion of said web.

7. An apparatus for the gathering of fruit from a tree, a gathering web adapted to be placed under a tree to receive fruit therefrom, a ring member fixed to said web, guide rings secured about a border of said web, flexible draw element means extending through said draw ring and through said guide rings, whereby drawing said flexible draw element means gathers the web into a bag, and a flexible support element for supporting a central portion of said bag whereby upon the releasing of said flexible draw elements said bag is opened.

References Cited

UNITED STATES PATENTS

| | | | |
|---|---|---|---|
| 389,697 | 9/1888 | Fleming | 56—329 |
| 1,121,406 | 12/1914 | Satterberg | 56—329 |
| 2,440,712 | 5/1948 | Bickel | 294—77 |
| 2,473,327 | 6/1949 | Born | 56—329 |
| 2,869,284 | 1/1959 | Abernathy et al. | 56—329 X |
| 3,338,041 | 8/1967 | Arpin | 56—329 |

LOUIS G. MANCENE, Primary Examiner

J. A. OLIFF, Assistant Examiner

U.S. Cl. X.R.

294—17; 254—137